Nov. 18, 1930.    E. PIQUEREZ    1,782,073
PUMP OUTFLOW REGULATING DEVICE
Filed May 18, 1929

E. Piquerez
INVENTOR

Patented Nov. 18, 1930

1,782,073

UNITED STATES PATENT OFFICE

EMILE PIQUEREZ, OF ST. CLOUD, FRANCE, ASSIGNOR TO SOCIÉTÉ ANONYME DES ETABLISSEMENTS TÉCALÉMIT, OF PARIS, FRANCE, A JOINT-STOCK COMPANY OF FRANCE

PUMP OUTFLOW REGULATING DEVICE

Application filed May 18, 1929, Serial No. 364,265, and in France May 26, 1928.

The present invention has for main object the new application of thermostatic apparatus for the automatic regulation of the outflow of a pump as a function of the temperature of the fluid set in motion by this pump.

This new application necessitates the combination of the following various main means: a pump, means for regulating the outflow of this pump, a thermostatic device, kinematic connecting means between this thermostatic device and the means regulating the outflow of the pump.

The new application or combination above defined can give rise to a great number of modifications, resulting from the variable nature of each of the various elementary means set forth. All these modifications are, of course, included in the scope of the invention; they can differ, for instance:

By the kind of pump employed: reciprocating pumps or pumps having a continuous rotary movement, volumetric or other pumps.

By the means regulating the outflow of the pump; these means can act:

(a) Either for modifying the cylinder charge of the pump, in the case of volumetric pumps;

(b) Or for modifying the component of displacement exerted on the fluid column, in the case of non volumetric pumps;

(c) Or for modifying the speed of actuation, of the pump by its motor, whatever may be the nature of the pump.

It is to be noted that the invention excludes the use of a variable contraction, either on the suction pipe line, or on the delivery pipe line, because this arrangement leads to a prejudicious increase of the passive resistances and also because it does not allow a wide margin of regulation.

By the nature and constitution of the thermostatic device, which may be of any kind; such a device will substantially comprise an expansible body, directly or mediately bathed in the fluid set in motion by the pump.

Finally, by the kinematic connecting means which, obviously, can vary according to circumstances and applications.

The invention includes therefore in its scope, all the modes of carrying out the new combination above mentioned; it includes also all the applications. But, quite particularly, the invention includes the application of this combination to the setting in circulation of a fluid in a closed circuit, as, for instance, and especially, in the case of the cooling water of explosion engines.

On the other hand, the invention consists in the connection, in one and the same mechanical structure, and particularly in or on one and the same casing, of a pump provided with outflow regulating means, and of a thermostat bathed in the fluid and acting on the said regulating means.

This arrangement can, of course, be carried out according to as many modifications as the new application previously indicated, and all these modifications are included in the scope of the invention; but the latter more particularly relates to a form of construction in which the pump is a pump provided with rotary blades or vanes, and which is mainly characterized in that these vanes can be set or orientated relatively to a plane at right angles to the axis of rotation, under the action of a thermostatic system, so that the outflow varies as a function of the temperature of the fluid put in circulation.

The accompanying drawing illustrates, by way of example only, such a form of construction.

Figure 1:
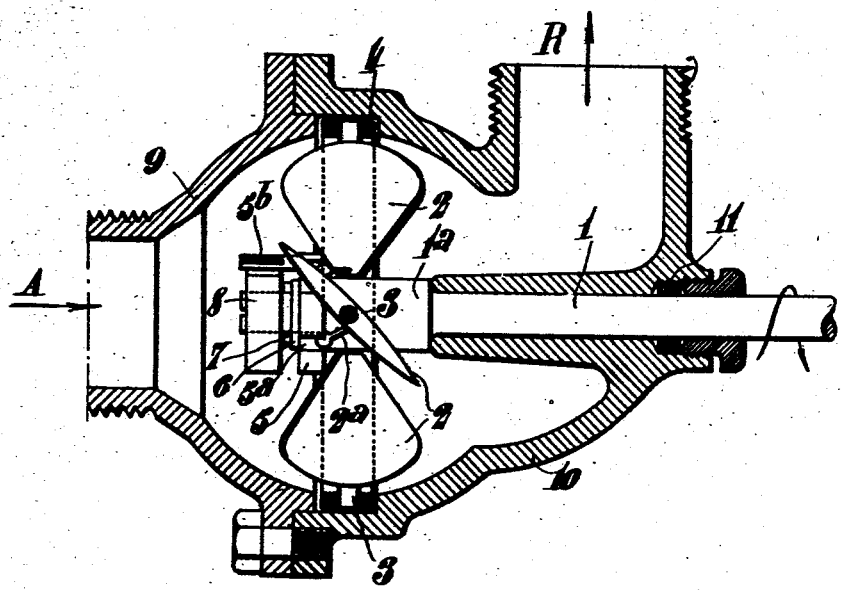
Figure 1 is an axial longitudinal section.
Figure 2:
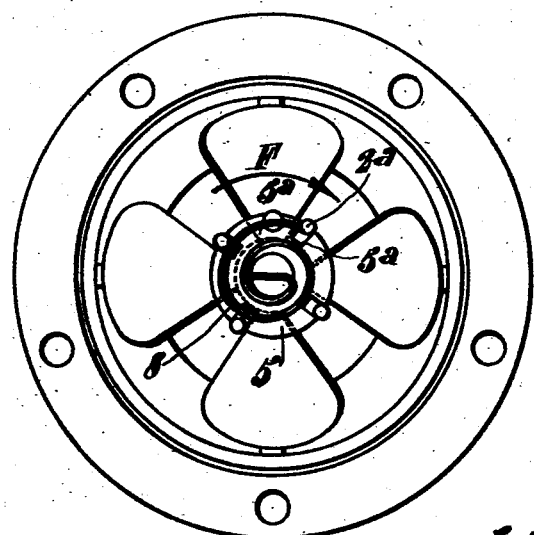
Figure 2 is the view of the corresponding end, the cover being removed.

The pump thus illustrated is of the general propeller type.

It is constituted by a shaft 1, mechanically actuated and forming at its end a hub 1ª on which are attached propeller blades.

Each of these blades, instead of being secured as in an ordinary propeller, is threaded on a spindle 3, about which it can take variable orientations. Each of these spindles 3 is held, on the one hand, in the hub and, on the other hand, in an outer ring 4, where it is held stationary.

Each of the blades 2 carries on its front face a perpendicular rod or stem 2ª the end of which is held in one of the notches 5ª of a ring 5, threaded on the end of the spindle, so as to be capable of rotating about the latter, the said ring being held in position by a washer 6 and a pin 7.

It is obvious that, if the ring 5 is caused to rotate about its axis, it will drive in its movement, the rods 2ª and, consequently, will determine the rotation of the blades 2 about their axis.

This function is automatically ensured by the regulating member constituted by a strip 8, made of two metals, wound in a spiral form about the extension of the shaft 1, and secured by one of its ends in a slot of this shaft, whilst the other is clamped in a member 5ᵇ integral with the ring 5.

This bimetallic strip 8 is constituted by a plating of two metals having different coefficients of expansion, for instance a strip of brass and a thin strip of nickel steel. In the example illustrated, this strip 8 is wound with the brass on the top. In this case, any heating of the strip 8 has for effect, brass expanding more than steel, to increase its curvature and, consequently, to drive along its end in the direction of the arrow F.

The whole of the pump is enclosed in a body made in two parts 9 and 10, presenting a suction connecting branch A and a delivery connecting branch R. The shaft 1 issues from the pump casing through a stuffing-box 11 and can be mechanically driven in any manner, in the direction of rotation illustrated.

The pump thus constituted, is assumed to be intended for ensuring the circulation of the cooling water of the engine of a motor car, and it is illustrated with the blades 2 in their position corresponding to hot water, under normal working conditions of the engine, the outflow of the pump being maximum. In fact, in this particular application, the pump will be preferably devised in order that its outflow shall be nil, in the cold state, and shall be maximum when the optimum working temperature of the engine is exceeded.

Owing to this arrangement, the reheating of the engine will take place more rapidly, since at the beginning there will be no circulation and, on the contrary, its cooling under normal working conditions can be as active as necessary.

If it is assumed that the engine stops, the water then cooling the bimetallic strip 8 drives the ring 5 in reverse direction to the arrow F, and the blades 2 rotate about their axis and come in a plane at right angles to the axis of the shaft 1.

When the engine is re-started, the outflow of the pump, the blades being thus set, will be nil and the volume of water contained in the jackets of the driving cylinders, will be reheated somewhat rapidly, since no circulation will take place. As soon as the water will be sufficiently reheated, the bimetallic strip will act for causing the blades 2 to rotated in the direction of the arrow and thus progressively increasing the outflow of the pump.

Owing to this contrivance, the engine very rapidly takes its normal temperature and the starting is thus largely facilitated. Moreover, in cold weather, the cooling of the engine will always be limited so as to constantly maintain the temperature in the neighbourhood of its optimum value.

It is obvious that all the foregoing is only an example of application of the device in accordance with the invention. For instance, the same pump might serve for causing the circulation of a reheating system to be maintained at a constant temperature; in this application, the pump would be arranged in order to have an outflow which is nil when the normal working temperature would be reached and a maximum outflow in the cold state.

This result might be obtained with the same arrangement, by simply winding the bimetallic strip with the steel on the top.

What I claim as my invention and desire to secure by Letters Patent is:—

In a centrifugal pump, the combination of a casing having a delivery port, a cover of this casing having an inlet port, a driving shaft journalled in a hub extending within the casing and integral with the same, a fluid-tight joint between the shaft and the casing, radial axes on the said shaft, blades respectively pivoted on each of the said axes, a crown surrounding the said blades and peripherally staying the said axes, a ring rotating on the said shaft and having peripheral side grooves, fingers respectively secured on each blade and fitting in the corresponding groove of the said ring; a finger secured on the periphery of the said ring and having a longitudinal groove, and a thermostat in spiral form, held, at one end, in the groove of the finger integral with the ring and, at the other end, in a side groove of the driving shaft, this thermostat being constituted by the superposition of two sheets of metals having different coefficients of expansion.

In testimony whereof I have signed this specification.

EMILE PIQUEREZ.